United States Patent Office 3,451,909
Patented June 24, 1969

3,451,909
ALKYLATION PROCESS
Frank J. Chloupek, South Holland, Ill., and Robert A Sanford, Louisville, Ky., assignors to Sinclair Research, Inc., New York, N.Y., a corporation of Delaware
No Drawing. Filed Sept. 6, 1966, Ser. No. 577,164
Int. Cl. C07c *3/24;* B01j *1/10*
U.S. Cl. 204—162                8 Claims

ABSTRACT OF THE DISCLOSURE

An improved alkylation process comprising illuminating a paraffin-olefin mixture with ultraviolet light having a wave length of about 1000 to 3000 A. and a dosage of about 5 to 500 kwh./hr./pound of feed, and contacting the irradiated mixture with a solid catalyst comprising catalytic amounts of transition metal on a solid adsorptive support under alkylation conditions.

---

The present invention realtes to an improve alkylation process and catalyst used in this process. More particularly, it concerns the alkylation of paraffinic hydrocarbons with olefins which involves illuminating a paraffin-olefin mixture with selected wave lengths of ultra-violet irradiation and passing the irradiated mixture over a solid alkylation catalyst.

Commercially, paraffin alkylation processes are generally catalyzed in the liquid phase with either hydrofluoric acid, sulphuric acid, or aluminum chloride serving as the catalyst. However, these catalysts are difficult to handle, must generally be regenerated outside the reactor and usually require refrigeration to minimize undesirable side reactions. Also, the conversion to alkylates in current alkylation processes together with selectivity of the reaction to form alkylates have not been satisfactory.

The infeasibility of fixed-bed alkylation to date has stemmed from a lack of suitable catalysts to selectively catalyze the reaction, and among other problems, an inability to regenerate effectively the few catalysts such as resins and Friedel-Crafts complexes which will promote this reaction. The foregoing factors, among others, are responsible for the high operating costs and undesirable results associated with the present type of liquid and solid phase paraffin alkylations. Accordingly, there is a need for an improved alkylation catalyst system.

The method of the present invention produces gasoline boiling range hydrocarbons using a catalyst system which can be easily regenerated. Advantageously, the improved process increases both the conversion of olefin to alkylates per pass, and the selectivity in forming the alkylate.

In the present invention, the alkylation of paraffins with olefins may be obtained by illuminating a mixture of at least one paraffin, either branched or straight-chain, and at least one olefin, either branched or straight-chain, with ultraviolet irradiation of selected wave lengths and passing the irradiated mixture while activated, over a solid alkylation catalyst under alkylation conditions, e.g. at a temperature of about 50 to 1000° F. and a pressure of about 0.1 to 100 atmospheres. In the past, the use of processes involving ultraviolet irradiation have been avoided due to their high cost. However, the process of the present invention is advantageous because excellent selectively in catalyzing the reaction to form alkylate can be achieved together with improved conversion of olefins to alkylate per pass. For example by using both the irradiation pretreatment and the solid catalyst, rather than the irradiation alone, the conversion level on olefins per pass may be improved several fold, even up to about 20 fold or more. Further improvement in the conversion level and improvement in selectivity can be realized by providing a free-radical chain transfer agent or initiator in the paraffin-olefin mitxure subjected to the ultra-violet irradiation treatment.

The irradiation of the paraffin-olefin mixture, with or without the initiator, can be carried out in the liquid or vapor phase, although the vapor phase is preferred. While the pressure during irradiation may range up to about 3000 p.s.i., it is perferable to maintain it at a sufficiently low level to permit vapor phase conditions to be realized. The temperature is often in the range of about 100° to 750° F.

An ultraviolet irradiation source which can produce a wave length in the range of about 1000 to 3000 A. may be used to pretreat the paraffin-olefin mixture prior to passing the irradiated gases over a solid alkylation catalyst. Since irradiation energy and conversion to alkylates are increased as the wave length is decreased, an advantageous range of irradiation wave lengths is about 1000 to 1500 A. The irradiation dosages in these wave lengths may often be about 5 to 500 kwh./hr./lb., preferably about 50–200 kwh./hr/lb., of feed. The length of time the alkylation reactants are exposed to ultraviolet irradiation can vary widely depending upon such factors as the amount of reactants, irradiation wave length, dosages, etc. Consequently the exposure is for the length of time necessary to substantially catalyze the paraffin/olefin mixture to alkylation. Often the residence time will be about 1 to 60 minutes, preferably about 5 to 20 minutes.

Typical sources of ultraviolet light which can be used include the Hanovia Model 79A10, 450 watt ultraviolet burner, the carbon arc, mercury vapor lamps, tungsten arc Kromeyer lamps, etc. Since high energy irradiation is necessary to fragment the olefins in producing alkylates of higher molecular weight the use of infrared lamps, which are a low energy form of radiation, is precluded.

The class of solid catalyst which can be used for the incorporation of olefins into existing paraffin structures to produce paraffins of higher molecular weight include the transition metal oxides, e.g. from Periods 4 and 5 of the Periodic Table including for example vanadium, chromium, manganese, iron, cobalt, nickel, copper, zinc, molybdenum, silver, cadmium, neodymium, etc. on a solid, adsorptive carrier such as silica, alumina, magnesia, titania, boria, zirconia, vanadium, tantalum, activated carbon, various mineral clays, silica-alumina, magnesia-alumina, silica-magnesia, boria-alumina, silica gel, or various combinations thereof. The support is often a refractory oxide and a silica-containing catalytic support is preferred. Typical of the silica-containing catalytic support catalysts is the amorphous, acidic, silica-alumina catalyst which can be derived from natural sources, or can be manufactured synthetically. This catalyst generally includes a minor amount of alumina, for instance, about 1 to 40, preferably about 10 to 35 weight percent alumina. Popular synthetic gel silica-alumina generally contains about 10 to 30% alumina. Two such catalysts are "Aerocat" which contains about 13% $Al_2O_3$ and "high alumina Nalcat" which contains about 25% $Al_2O_3$, with substantially the balance being silica. The silica-alumina may be only partially of synthetic material; e.g., as may be made by precipitation of silica-alumina on an activated clay. One example of such silica-alumina contains about equal amounts of silica, alumina gel and clay. The preferred silica-alumina is synthetic gel silica-alumina and contains at least about 50% silica and usually at least about 50 to 90% silica based on the weight of the catalyst. The silica-alumina catalysts of the instant invention can also contain minor amounts of other materials such as magnesia, zirconia, etc.

The catalyst employed in the process of the present invention can be easily regenerated employing conventional procedures, for instance, by subjecting it to an oxygen-containing gas at a temperature sufficient to burn off carbon deposited on the catalyst during the alkylation process. This oxygen-containing gas, e.g., an oxygen-nitrogen mixture, may often contain about 0.01 weight percent to 5 weight percent oxygen but preferably contains about 0.5 to 1.5 weight percent oxygen, and may be introduced at a flow rate such that the maximum temperature at the site of combustion is below about 1000° F.

The alkylation process of the present invention generally involves contacting the feed with catalysts in the form of rough granules or a powder, or as compressed tablets, extruded pellets or the like ranging in size from about $\frac{1}{32}''$ to $\frac{1}{2}''$ in diameter and from about $\frac{1}{16}''$ to $1''$ in length. Fixed, moving or fluidized catalyst bed reactors may be used, and the process may be conducted continuously or batchwise by methods well known in the art.

The paraffins and olefins to be used in the process may be derived from any suitable source as is known in the art and may be in either the pure state or in mixture with other constituents which will not affect the alkylation reaction. Although isoparaffins are the preferred hydrocarbons that can be alkylated, n-paraffins can also be alkylated in accordance with the present invention. As examples of the paraffinic hydrocarbons that can be alkylated, there can be mentioned any of the paraffins or isoparaffins containing from about 3 to 6 carbon atoms, preferably about 3 to 4 carbon atoms, such as, for examples, propane, n-butane, isobutane, n-pentane, isopentane, etc.

The alkylating agents suitable for use in the present process are olefins, generally containing about 2 to about 8 carbon atoms, preferably from 2 to about 4 carbon atoms. Mono-olefins are preferred including ethylene, propylene, butylene, isobutylene, etc.

Among the initiators or chain transfer agents that can be used are halogens, e.g., chlorine, bromine and iodine; halogenated hydrocarbons such as carbon tetrachloride, chloroform, dichloroethane, methyl and ethyl bromide, bromopropane, and methyl and ethyl iodides; ketones, e.g., acetone; aldehydes, e.g., formaldehyde; mercaptans, such as aliphatic mercaptans, aryl mercaptans, arylalkyl mercaptans, cycloaliphatic mercaptans, etc.; organic sulfides and disulfides; hydrogen sulfide; organic peroxides and the like. The initiators are often present in the mixture in a range of about 0.1 to 10% by weight, preferably about 0.5 to 2%.

The particular process conditions of temperature, pressure, residence time, etc. useful in this invention can vary and are usually chosen to satisfy the requirements of the particular materials being utilized.

The reaction is usually a vapor phase process; however, under certain reaction conditions, where a proper choice of reactants has been made, the reaction can be carried out in the liquid phase. Ordinarily, however, vapor phase reaction is preferred. In carrying out the process of the present invention, temperatures of about 50 to 1000° F. may be employed; however, temperatures in ther ange of about 300 to 900° F. are generally preferred.

The pressure employed in the exercise of the present invention can vary widely. Alykalation with less volatile olefins can be effected at atmospheric pressure (ambient pressure) or lower, if desired; however, with normally gaseous olefins or with normally gaseous or low boiling isoparaffins, super atmospheric pressure is generally used in order to provide an adequate concentration of reactants to contact the catalyst under reaction conditions. Pressures in the range of about 0.10 to 100 atmospheres may be used; however, pressures of about 1 atmosphere to 80 atmospheres are generally preferred.

The paraffinic space velocity, in most cases, will be from about 0.05 to 10, preferably about 0.25 to 4, weights of paraffin per weight of catalyst per hour (WHSV).

The paraffinic hydrocarbon is generally employed in a molar ratio to the alkylating agent of from about 1/1 to 100/1, and preferably from about 2/1 to 10/1. Diluent gases, e.g., inert or hydrocarbon, such as hydrogen, nitrogen and methane can also be utilized in the present process usually in the amounts ranging from a diluent gas to alkylating agent molar ratio of about 0.01/1 to 20/1 or more, preferably about 2/1 to 10/1.

Examples 1 to 5 illustrate the alkylation of paraffinic hydrocarbons with olefins by irradiating the paraffin-olefin mixture with ultraviolet irradiation and passing the mixture directly over a solid catalyst. The results are tabulated in Table I. Examples 6 to 10 illustrate a paraffinic alkylation process wherein an initiator is added to the paraffin-olefin mixture prior to the irradiation pretreatment. The results are tabulated in Table II. These examples are given for purposes of illustration and are not to be considered as limiting.

Example I

A Hanovia model 79A10, 450 watt ultraviolet burner is placed within a 6-inch high cylindrical coil of 8 mm. O.D. quartz tubing (five feet in length). The assembly is immersed in a quartz jar surrounded by magnesium oxide to reflect stray light back into the reaction cavity. This area is cooled with a stream of air to maintain the desired temperature. The feed, which is a mixture of isobutane and ethylene is first irradiated with the ultraviolet burner using irradiation dosages of about 25 kwh./hr./lb. The irradiated effluent is then passed directly into a 10 mm. O.D. Pyrex reactor tube containing 10 grams of 12% chromia on a silica-alumina catalytic support heated to about 750° F. The alkylation reaction is conducted at a temperature of about 750° F., and a pressure of about one atmosphere. The feeds are introduced by means of calibrated flow meters and the resulting alkylate is analyzed by gas phase chromatography. The test results are in Table I.

Example II

Example II is the same as Example I, except the catalyst is a 5% cupric oxide and 5% chromia on silica-alumina. The test results are in Table I.

Example III

Example III is the same as Example I, except the catalyst is a 7% vanadia on alumina. The test results are in Table I.

Example IV

Example IV is the same as Example I, except the catalyst is a 11% cobalt and a 0.7% sodium ion on silica. The test results are in Table I.

Example V

Example V is the same as Example I, except the catalyst is a 10% chromia on silica. The test results are in Table I.

Examples VI to X

Examples VI to X are the same as Examples I to V, with the exception that the feed contains 2% carbon tetrachloride as an initiator. The test results are in Table II.

TABLE I

| | Example | | | | |
|---|---|---|---|---|---|
| | I | II | III | IV | V |
| | Run No. | | | | |
| | 1465-12 | 1465-13 | 1465-17 | 1465-20 | 1465-23 |
| Catalyst | $Cr_2O_3$-$SiO_2$/$Al_2O_3$ | $CuO_2Cr_2O_3$-$SiO_2$/$Al_2O_3$ | $V_2O_3$/$Al_2O_3$ | Co-Na+$SiO_2$ | $Cr_2O_3$/$SiO_2$ |
| Percent $M_1$ | 12 | 5 | 7 | 11 | 10 |
| Percent $M_2$ | | 5 | | 0.7 | |
| Conditions: | | | | | |
| Temp. (reaction)° F | 750 | 750 | 750 | 750 | 750 |
| Temp. (coil) ° F | 550 | 550 | 550 | 550 | 550 |
| Pressure/atm | 1 | 1 | 1 | 1 | 1 |
| Paraffin | $iC_4$ | $iC_4$ | $iC_4$ | $iC_4$ | $iC_4$ |
| Olefin | $C_2=$ | $C_2=$ | $C_2=$ | $C_2=$ | $C_2=$ |
| Par./Ole. mole ratio | 2 | 2 | 2 | 2 | 2 |
| Coil res. time/min | 10 | 10 | 10 | 10 | 10 |
| WHSV | 0.25 | 0.25 | 0.25 | 0.25 | 0.25 |
| Results: Conv. on olefin/percent | 27.8 | 25.0 | 26.6 | 15.3 | 8.6 |
| Selectivity to: | | | | | |
| n-Pentane | 4.2 | 9.2 | 6.0 | 24.7 | 2.6 |
| i-Pentane | 8.5 | 4.6 | 2.1 | 8.1 | 2.6 |
| n-Hexane | 1.7 | 2.1 | 10.3 | | 3.5 |
| 2-Methyl-pentane+2,3-dimethyl-butane | 1.0 | 3.7 | 2.3 | 13.8 | 2.6 |
| 3-methyl-pentane | 0.3 | 2.1 | 2.1 | | 5.3 |
| Neohexane | 0.6 | 0.9 | 0.8 | 0.8 | 0.7 |
| $C_5=$ | 74.8 | 33.0 | 48.2 | 20.2 | 33.5 |
| $C_6=$ | 8.9 | 44.4 | 28.2 | 32.4 | 42.0 |

TABLE II

| | Example | | | | |
|---|---|---|---|---|---|
| | VI | VII | VIII | IX | X |
| | Run No. | | | | |
| | 1465-12I | 1465-13I | 1465-17I | 1465-20I | 1465-23I |
| Catalyst | $Cr_2O_3$-$SiO_2$/$Al_2O_3$ | $CuOCr_2O_3$-$SiO_2$/$Al_2O_3$ | $V_2O_3$/$Al_2O_3$ | Co-Na+/$SiO_2$ | $Cr_2O_3$/$SiO_2$ |
| Percent $M_1$ | 12 | 5 | 7 | 11.0 | 10 |
| Percent $M_2$ | | 5 | | 0.7 | |
| Conditions: | | | | | |
| Temp. (reactor) ° F | 750 | 750 | 750 | 750 | 750 |
| Temp. (coil) ° F | 550 | 550 | 550 | 550 | 550 |
| Pressure/atm | 1 | 1 | 1 | 1 | 1 |
| Paraffin | Isobutane | Isobutane | Isobutane | Isobutane | Isobutane |
| Olefin | Ethylene | Ethylene | Ethylene | Ethylene | Ethylene |
| Par./Ole. mole ratio | 2 | 2 | 2 | 2 | 2 |
| Coil res. time/min | 10 | 10 | 10 | 10 | 10 |
| WHSV | 0.25 | 0.25 | 0.25 | 0.25 | 0.25 |
| Wt. percent $CCl_4$ | 2 | 2 | 2 | 2 | 2 |
| Results: Percent conv. on olefin | 55.7 | 52.1 | 34.7 | 32.1 | 55.1 |
| Selectivity to: | | | | | |
| n-Pentane | 3.7 | 4.6 | 1.9 | | 1.1 |
| i-Pentane | 10.6 | 1.5 | 0.5 | 4.8 | 3.5 |
| n-Hexane | 0.5 | 0.7 | 3.3 | 0.5 | 1.3 |
| 2-methyl-pentane+2,3-dimethyl-butane | 18.6 | 20.8 | 23.9 | 15.5 | 21.7 |
| 3-methyl-pentane | 4.0 | 2.1 | 3.9 | 1.6 | 2.7 |
| Neohexane | 25.8 | 39.2 | 39.2 | 73.0 | 32.8 |
| Do | 10.5 | 5.2 | 1.0 | | |
| $C_5=$ | 17.8 | 12.2 | 15.5 | 2.2 | 12.2 |
| $C_6=$ | 8.5 | 13.7 | 10.3 | 2.4 | 24.7 |

It is claimed:

1. A process of alkylating an alkylatable paraffinic hydrocarbon which comprises reacting the alkylatable paraffinic hydrocarbon containing from about 3 to 6 carbon atoms with an olefin containing from about 2 to 8 carbon atoms, under the effect of ultraviolet irradiation, in amounts of about 5 to 500 kwh. per hour, per pound, with a wave length of about 1000 to 3000 A., and contacting the irradiated mixture with a solid catalyst under alkylation conditions from a temperature of about 50 to 1000° F., said solid catalyst comprising catalytic amounts of transition metal on a solid adsorptive support.

2. The process of claim 1 wherein a free-radical initiator is provided in the paraffin-olefin mixture subjected to the ultraviolet irradiation treatment.

3. The process of claim 1 wherein the alkylation temperature is from about 300 to 900° F.

4. The process of claim 1 wherein said solid catalyst is a transition metal oxide of a metal selected from the group consisting of vanadium, chromium, niobium, cobalt, and copper, on a solid adsorptive refractory oxide support.

5. A process of alkylating an alkylatable paraffinic hydrocarbon which comprises reacting an alkylatable paraffinic containing from about 3 to 4 carbon atoms with an olefin containing from about 2 to 4 carbon atoms, said mixture containing a free-radical initiator, under the effect of ultraviolet irradiation in amounts of about 50 to 200 kwh. per hour per pound and having a wave length of about 1000 to 1500 A., and contacting the irradiated mixture with a solid catalyst under alkylation conditions from a temperature of about 300 to 900° F., said solid catalyst comprising a catalytic amount of a transition metal on a solid, adsorptive refractory oxide support.

6. The process of claim 5 wherein the solid catalyst is a transition metal oxide selected from the group consisting vanadium, chromium, cobalt and copper on a support selected from the group consisting of silica, alumina and mixtures thereof.

7. The process of claim 5 wherein the free-radical initiator is present in the paraffin-olefin mixture in an amount of about 0.5 to 2% by weight.

8. The process of claim 5 wherein the paraffinic hydrocarbon is isobutane and the olefin is ethylene.

References Cited

UNITED STATES PATENTS 2,437,531   3/1948   Huffman _____ 204—162
3,050,453   8/1962   Handschy et al. _____ 204—162

HOWARD S. WILLIAMS, *Primary Examiner.*